July 10, 1956  J. LATZEN  2,754,141
BALL AND SOCKET JOINTS
Filed Jan. 2, 1953
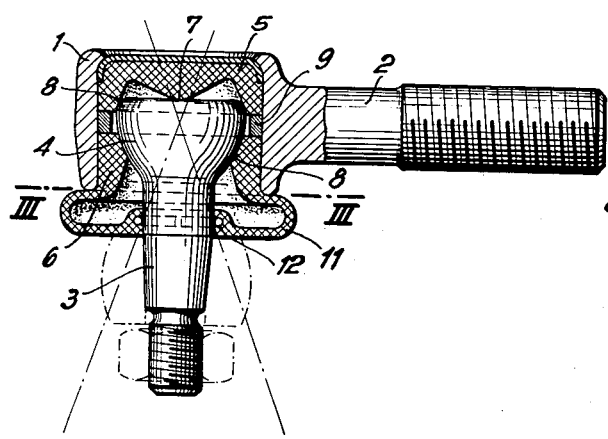
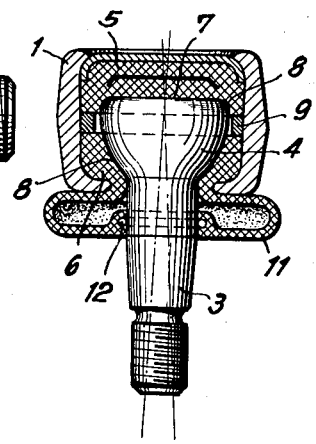
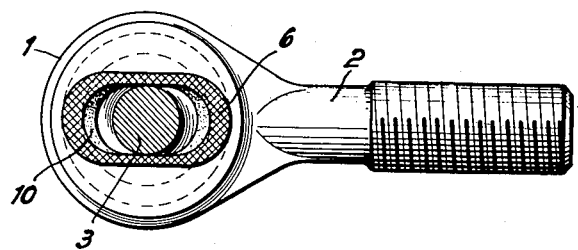
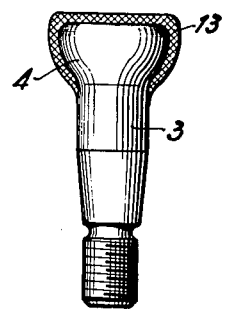
INVENTOR
JOSEF LATZEN
BY Robert H. Jacob
AGENT

United States Patent Office 2,754,141
Patented July 10, 1956

2,754,141

BALL AND SOCKET JOINTS

Josef Latzen, Dusseldorf-Oberkassel, Germany, assignor to the firm A. Ehrenreich & Cie., Dusseldorf-Oberkassel, Germany Application January 2, 1953, Serial No. 329,298

Claims priority, application Germany January 8, 1952

2 Claims. (Cl. 287—90)

This invention relates to a ball and socket joint comprising a socket having a lever arm and a ball head disposed in the socket and surrounded by an elastic material, for example rubber, and an arm on the ball extending out of the socket.

In the known joints of the above-mentioned kind, the ball head is, for example, vulcanised to the rubber which is fitted in the socket, or the rubber in the socket is pressed tightly around the ball. These known ball and socket joints have the disadvantage that the friction between the ball and the elastic material is very great, so that relative movement between the parts of the joint is difficult. Since, however, in the steering gear of a power vehicle at least 4–6 of such joints are usually used and coact with one another, a relatively large force must be exerted to actuate the steering gear in order to overcome friction, which is extremely undesirable.

According to the invention, the socket is provided with a rubber lining, the inner surface of which bears against the spherical part of the ball and conforms to the size and shape thereof, and enables the joint to move without being deformed to any substantial extent. By this means the result is obtained that the ball has a resilient bearing in the socket, but nevertheless its movement is not hindered in any way.

In accordance also with the invention, the rubber lining may be formed in one piece with a packing, usually in the form of a bellows, which bears against the arm of the ball at the place where it emerges from the socket. This has the advantage that the construction of the joint is considerably facilitated.

It is preferable to make the outlet opening for the ball arm at the place where it extends out of the rubber lining and the socket in the form of an aperture which is elongated in the direction of the main stress on the joint, i. e. in the direction in which the lever arm extends from the socket. In this way the joint is able to make large angular deflections of, for example, 40°, in the main direction of stress without the occurrence of frictional and deforming stresses on the rubber lining which interfere with the elastic bearing. Such angular deflections occur, for example, owing to the springing of the vehicle. In the transverse direction to the socket lever, i. e. at right angles to the axis of the lever, only small angular deflections of 6°, for example, occur and these only produce small and harmless deformations of the rubber lining surrounding the ball.

It is also preferable to divide the rubber lining in the central zone of the ball and to insert a pressure ring in the joint at this place. The pressure ring prevents any undesirably large movement of the ball in its socket, particularly in the direction of the socket lever, which might result from deformation of the rubber lining surrounding the ball, when it yields to large forces and which would cause excessive wear of the lining. Of course, the rubber lining can also be divided into an upper part and lower part without providing a pressure ring between the parts. By dividing the rubber lining in this manner the assembly of the joint is facilitated. It is also possible to vulcanize the pressure ring into the rubber lining.

It is also advantageous to provide the inner surface of the rubber lining which is in contact with the ball head with an anti-friction medium, for example to graphitise it. Owing to the joint being enclosed a relatively small amount of lubricating medium is sufficient to ensure that the joint will work reliably and without attention for a long time. The rubber lining may also be made of graphitised rubber.

The ball can be coated with artifical material or other non-metallic material, for example rubber. In this case the metallic surface of the ball does not slide in the rubber lining but both contacting sliding surfaces consist of non-metallic material.

The top of the ball may be flattened and the upper part of the rubber lining may be provided with a rib which runs transversely of the axis of the socket lever and against which rib the flat top of the ball is supported. The hollow spaces which then remain on either side of the rib ar sufficient to allow a large angular deflection of the ball to take place in the main direction of stress of the joint. The rib prevents the socket lever from rotating about its own axis. It is also within the scope of the invention to use an elastic material other than rubber for the lining.

A ball and socket joint in accordance with the invention is illustrated, by way of example, in the accompanying drawing in which:

Fig. 1 shows the ball and socket joint in longitudinal elevation partly in section;

Fig. 2 is a section through the joint at right angles to the axis of the socket lever;

Fig. 3 is a section on the line I—I of Fig. I, and

Fig. 4 shows a ball provided with a non-metallic covering.

Referring to the drawing, the ball and socket joint consists of a socket 1 having an arm or lever 2 and an arm 3 carrying a ball 4 the upper part of which may be flat. In the socket is disposed a rubber lining which, in the example illustrated, consists of an upper part 5 and a lower part 6. The upper part has an internal rib 7 which runs transversely of the axis of the arm or lever 2. This rib bears against the flat part of the ball. The inner surface 8 of the rubber lining which is in contact with the spherical part of the ball conforms as regards its shape and size to that of the ball, so that the ball rests in the lining without any or any substantial pressure.

In the example illustrated, a pressure ring 9, for example of steel-bronze, is inserted in the gap between the upper part 5 and the lower part 6 of the rubber lining. The aperture 10 through which the ball arm extends out of the rubber lining and out of the socket is elongated in the direction of the axis of the lever 2. A packing bellows 11, which bears against the ball arm 3 and is secured to the latter by a resilient clamping ring 12, is made in one piece with the rubber lining. Of course, the joint can also be provided with a seal or packing of another kind, for example, with the usual open rubber cap.

The inner surface of the rubber lining is provided with a suitable anti-friction medium, for example, it is graphitized.

As shown in Fig. 4 the ball head 4 is provided with a non-metallic covering 13, for example of rubber.

I claim:

1. A ball and socket joint comprising a lever arm presenting a socket having a generally cylindrical inner surface area and a shank having a ball head presenting a continuous lateral surface area of spherical conformation and a generally flat end surface disposed in said socket, an elastic lining of rubber or the like comprising an upper portion and a lower portion fitted into said socket and presenting spherical bearing surfaces in direct engagement with the spherical surface areas of said ball head and a bearing portion extending from said upper portion inwardly to said end surface and having smoothly sliding engagement therewith in a manner to avoid straining and deforming of said lining, said elastic lining being divided along the equatorial belt around said ball head to define a gap and a cylindrical ring of hard material such as steel bronze being disposed in said gap with its outer periphery in firm engagement with the walls of said socket and its inner surface proximate said ball head for engagement with the spherical surface of said ball head.

2. A ball and socket joint comprising a lever arm presenting a socket having a generally cylindrical inner surface area and a shank having a ball head presenting a continuous lateral surface area of spherical conformation and a generally flat end surface disposed in said socket, an elastic lining of rubber or the like comprising an upper portion and a lower portion fitted into said socket and presenting spherical bearing surfaces in direct engagement with the spherical surface areas of said ball head and a bearing portion extending from said upper portion inwardly to said end surface and having smoothly sliding engagement therewith in a manner to avoid straining and deforming of said lining, said elastic lining defining an oblong aperture adjacent the juncture of said ball head and said shank of dimensions corresponding to the diameter of said shank transversely to the axis of said lever and greater than the diameter of said shank in the direction longitudinally of said lever, and defining also a wide annular pocket around said shank downwardly from said ball head including an inwardly extending flange fitted closely around said shank to permit free angular movement of said ball headed shank relative to said socket, said elastic lining being divided along the equatorial belt around said ball head to define a gap and a cylindrical ring of hard material such as steel bronze being disposed in said gap with its outer periphery in firm engagement with the walls of said socket and its inner surface proximate said ball head for engagement with the spherical surface of said ball head.

References Cited in the file of this patent

UNITED STATES PATENTS

| | | |
|---|---|---|
| 1,545,067 | Robbins | July 7, 1925 |
| 1,908,789 | Ragan | May 16, 1933 |
| 1,923,601 | Weaver | Aug. 22, 1933 |
| 1,989,116 | Strauss | Jan. 29, 1935 |
| 2,197,889 | Katcher | Apr. 23, 1940 |
| 2,304,732 | Flumerfelt | Dec. 8, 1942 |
| 2,424,914 | Brown | July 29, 1947 |

FOREIGN PATENTS

| | | |
|---|---|---|
| 622,244 | Germany | of 1935 |
| 644,228 | Germany | of 1937 |